(12) United States Patent
Juhasz et al.

(10) Patent No.: US 8,514,656 B2
(45) Date of Patent: Aug. 20, 2013

(54) SENSOR ARRANGEMENT FOR DETECTING MOTION INDUCED NOISE IN TOWED MARINE ELECTROMAGNETIC SENSOR STREAMERS

(75) Inventors: Andras Robert Juhasz, Hägersten (SE); Gustav Göran Mattias Südow, Solna (SE); Ulf Peter Lindqvist, Segeltorp (SE)

(73) Assignee: PGS Geophysical AS, Lysaker (NO)

( * ) Notice: Subject to any disclaimer, the term of this patent is extended or adjusted under 35 U.S.C. 154(b) by 307 days.

(21) Appl. No.: 13/051,489

(22) Filed: Mar. 18, 2011

(65) Prior Publication Data

US 2012/0236684 A1 Sep. 20, 2012

(51) Int. Cl.
*G01V 1/38* (2006.01)
*G01V 3/00* (2006.01)

(52) U.S. Cl.
USPC .............................................. 367/20; 324/365

(58) Field of Classification Search
USPC .......................................... 324/365; 367/20
See application file for complete search history.

(56) References Cited

U.S. PATENT DOCUMENTS

| | | | |
|---|---|---|---|
| 4,481,611 A | 11/1984 | Burrage | |
| 6,624,475 B2 | 9/2003 | Bryant et al. | |
| 7,139,217 B2 * | 11/2006 | Scott | 367/20 |
| 7,142,481 B1 | 11/2006 | Metzbower et al. | |
| 7,446,535 B1 | 11/2008 | Tenghamn et al. | |
| 7,602,191 B2 | 10/2009 | Davidsson | |
| 7,671,598 B2 | 3/2010 | Ronaess et al. | |
| 7,693,005 B2 | 4/2010 | Stenzel et al. | |
| 7,737,698 B2 | 6/2010 | Tenghamn et al. | |
| 2006/0238200 A1 * | 10/2006 | Johnstad | 324/337 |
| 2010/0017133 A1 | 1/2010 | Ziolkowski et al. | |
| 2010/0045296 A1 | 2/2010 | Tenghamn | |
| 2010/0315088 A1 | 12/2010 | Ziolkowski et al. | |
| 2012/0153959 A1 * | 6/2012 | Mackay | 324/365 |

FOREIGN PATENT DOCUMENTS

| | | |
|---|---|---|
| EP | 2068175 A1 | 6/2009 |
| WO | 2009032274 A1 | 3/2009 |
| WO | 2011107438 A1 | 9/2011 |

OTHER PUBLICATIONS

Burrows, M., "Motion-Induced noise in ELectrode-Pair Extremely Low Frequency (ELF) Receiving Antennas", IEEE Transactions on Communications, Apr. 1974, pp. 540-542.*
United Kingdom Search Report for Application No. GB1204476.4, dated Jun. 29, 2012.
Vectran Product Brochure, 2008 www.vectran.net.

* cited by examiner

*Primary Examiner* — Ian J Lobo

(57) ABSTRACT

An electromagnetic sensor streamer may include a jacket, at least one electromagnetic sensor in operational communication with a voltage measuring circuit disposed inside the jacket, and at least one wire coil. The at least one wire coil is in signal communication with the voltage measuring circuit, and the voltage measuring circuit is configured to determine motion-induced voltages imparted to the at least one electromagnetic sensor in the streamer.

20 Claims, 5 Drawing Sheets

SENSOR ARRANGEMENT FOR DETECTING MOTION INDUCED NOISE IN TOWED MARINE ELECTROMAGNETIC SENSOR STREAMERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine electromagnetic surveying using towed electromagnetic sensor streamers. More specifically, at least in some embodiments, the invention relates to structures and arrangements for sensors to detect motion induced noise in electromagnetic sensors in towed streamers.

U.S. Patent Application Publication No. 2010/0017133 filed by Ziolkowski et al. and incorporated herein by reference describes techniques for detecting motion induced noise in towed marine electromagnetic sensor survey streamers. The detected motion induced noise may be used to improve the quality of electromagnetic signals detected in response to an electromagnetic field imparted into formations below the bottom of a body of water.

There is a need for improved arrangements of sensors for detecting motion induced noise in towed electromagnetic sensor streamers.

DETAILED DESCRIPTION

Figure 1:
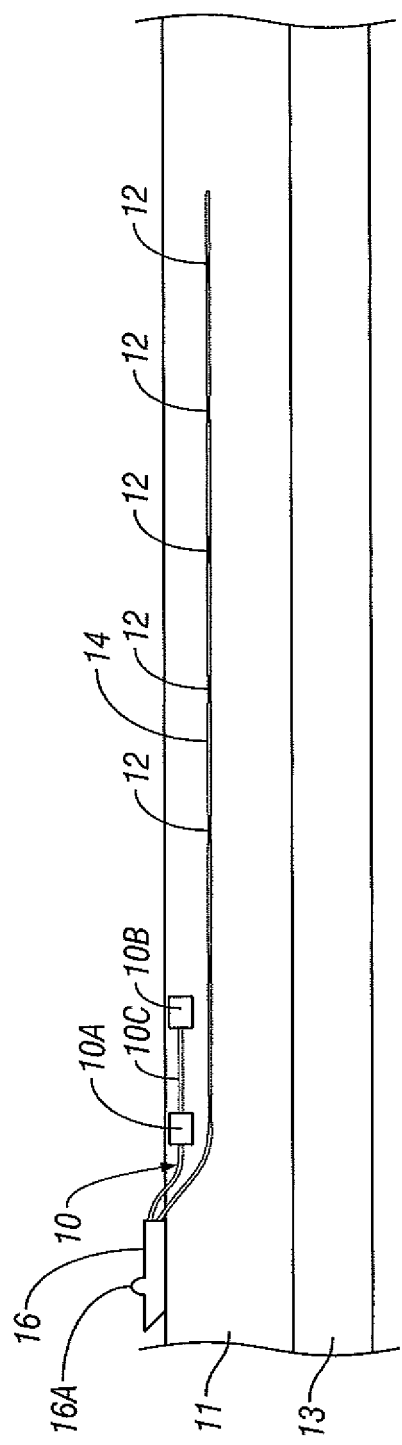
FIG. 1 shows an example embodiment of a towed marine electromagnetic survey system.

FIG. 1 shows an example embodiment of a marine electromagnetic survey system that may be used to implement the invention. The system shown in FIG. 1 includes an electromagnetic transmitter cable 10 and an electromagnetic sensor streamer 14. The electromagnetic sensor streamer 14 includes a plurality of electromagnetic sensors 12. The electromagnetic transmitter cable 10 and electromagnetic sensor streamer 14 may be towed behind a survey vessel 16 along a body of water 11, such as a lake or ocean. The electromagnetic transmitter cable 10 may include, for example, an electrode bi-pole, including two spaced apart electrodes 10A, 10B, along an insulated, reinforced electrical cable 10C to act as an electromagnetic transmitter. The electromagnetic transmitter in other example embodiments could also include a magnetic field source such as one or more wire loops (not shown). Equipment disposed on the survey vessel 16, shown generally at 16A and referred to for convenience as a "recording system" may include circuits (not shown separately) arranged to pass electric current through the electromagnetic transmitter at selected times. The current may have any known waveform used for marine electromagnetic surveying, including without limitation, for example, alternating current at one or more discrete frequencies, switching direct current on, switching direct current off, changing direct current polarity, or switching direct current in predetermine switching sequence such as a pseudo-random binary sequence. Other circuits (not shown) included in recording system 16A may record or analyze signals detected by the various electromagnetic sensors 12 on the electromagnetic sensor streamer 14. Electromagnetic fields produced by passing the current through the electromagnetic transmitter may travel through the water 11, and through formations 13 below the water bottom. Electromagnetic fields induced in response may be detected by the electromagnetic sensors 12 on the electromagnetic sensor streamer 14. The various signals may be interpreted to infer the spatial distribution of electrical conductivity in the formations 13.

Figure 2:
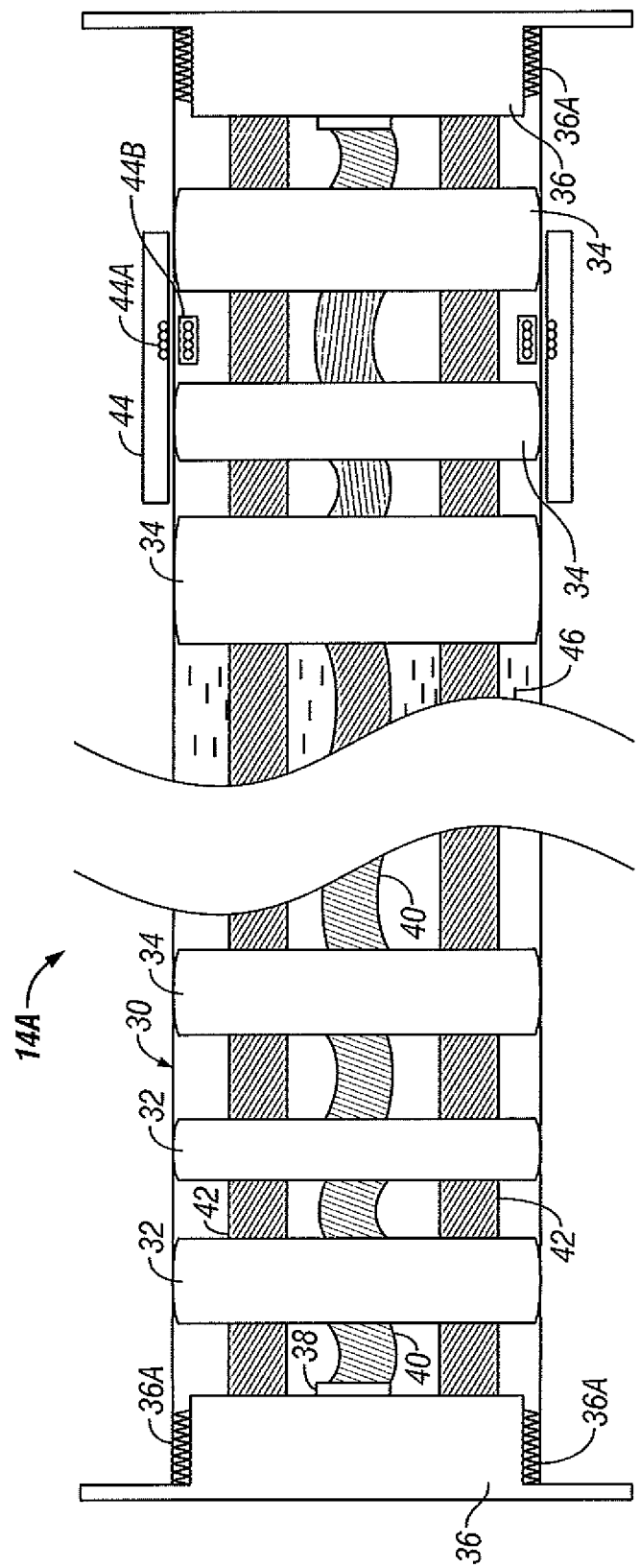
FIG. 2 shows a cut away view of an example embodiment of a segment of an electromagnetic sensor streamer.

FIG. 2 is a cut away view of a streamer segment 14A of a typical marine electromagnetic sensor streamer (14 in FIG. 1). A electromagnetic sensor streamer as shown in FIG. 1 may extend behind the survey vessel (16 in FIG. 1) for several kilometers, and is typically made from a plurality of streamer segments 14A as shown in FIG. 2 connected end to end behind the survey vessel (16 in FIG. 1)

The streamer segment 14A in the present embodiment may be between about 50 meters and about 500 meters in overall length. In some embodiments, streamer segment 14A may be between about 100 meters and 200 meters in overall length. In certain embodiments, streamer segment 14A may be about 150 meters in overall length. An electromagnetic sensor streamer such as shown at 14 in FIG. 1 thus may be formed by connecting a selected number of such streamer segments 14A end to end. The streamer segment 14A may include a jacket 30, which in the present embodiment may be made from, for example, 3.5 mm thick transparent polyurethane having a selected external diameter. Other non-conductive, waterproof materials may also be used in jacket 30. In each such streamer segment 14A, each axial end of the jacket 30 may be terminated by a coupling/termination plate 36. The coupling/termination plate 36 may include rib elements 36A on an external surface of the coupling/termination plate 36. Such surface is inserted into the end of the jacket 30, so as to seal against the inner surface of the jacket 30 and to grip the coupling/termination plate 36 to the jacket 30 when the jacket 30 is secured by and external clamp (not shown). In the present example embodiment, two strength members 42 may be coupled to the interior of each coupling/termination plate 36 and can extend the length of the streamer segment 14A. The strength members 42 may be made, for example, from a fiber rope made from a fiber sold under the trademark VECTRAN, which is commercially available from Kuraray America, Inc., of Fort Mill, S.C. The strength members 42 may transmit axial load along the length of the streamer segment 14A. When one streamer segment 14A is coupled end to end to another such segment (not shown in FIG. 2), the mating Coupling/termination plates 36 are coupled together using any suitable connector, so that the axial force is transmitted through the coupling/termination plates 36 from the strength members 42 in one streamer segment 14A to the strength member in the adjoining streamer segment.

The streamer segment 14A may include a number of buoyancy spacers 34 and/or sensor holders 32 disposed within the jacket 30 and coupled to the strength members 42 at spaced apart locations along their length. The buoyancy spacers 34 may be made from foamed polyurethane or other suitable, selected density material. The buoyancy spacers 34 may have a density selected to provide the streamer segment 14A with approximately the same overall density as the water (11 in FIG. 1), so that the electromagnetic sensor streamer (14 in FIG. 1) will be substantially neutrally buoyant in the water (11 in FIG. 1). As a practical matter, the buoyancy spacers 34 may provide the streamer segment 14A with an overall density very slightly less than that of fresh water. Appropriate overall density may then be adjusted in actual use by adding or removing selected buoyancy spacers 34.

The streamer segment 14A may include a generally centrally located conductor cable 40 which can include a plurality of insulated electrical conductors (not shown separately), and may include one or more optical fibers (not shown). The conductor cable 40 may conduct electrical and/or optical signals from electromagnetic sensors (which will be further explained below with reference to FIG. 3 and FIG. 6) to the recording system (16A in FIG. 1). The conductor cable 40 may in some embodiments also carry electrical power to various signal processing circuits (not shown separately) disposed in one or more streamer segments 14A, or disposed elsewhere along the electromagnetic sensor streamer (14 in FIG. 1). The length of the conductor cable 40 within a streamer segment 14A may be generally longer than the axial length of the streamer segment 14A under the largest expected axial stress on the streamer segment 14A, so that the electrical conductors and optical fibers in the conductor cable 40 will not experience any substantial axial stress when the electromagnetic sensor streamer (14 in FIG. 1) is towed through the water by the survey vessel (16 in FIG. 1). The conductors and/or optical fibers in the conductor cable 40 may be terminated in a connector 38 disposed in each coupling/termination plate 36 so that when the streamer segments 14A are connected end to end, corresponding electrical and/or optical connections may be made between the electrical conductors and optical fibers in the conductor cable 40 in the adjoining streamer segments 14A.

At selected positions along the electromagnetic sensor streamer (14 in FIG. 1) a geomagnetic heading sensor 44 may be affixed to the outer surface of the jacket 30. The geomagnetic heading sensor 44 includes a directional sensor (not shown separately) for determining the geomagnetic orientation of the streamer segment 14A at the location of the geomagnetic heading sensor 44. The geomagnetic heading sensors 44 may include an electromagnetic signal transducer 44A for communicating signals to a corresponding transducer 44B inside the jacket 30 for communication along the conductor cable 40 to the recording system (16A in FIG. 1). Measurements of direction are used, as is known in the art, to infer the position of the various sensors in the streamer segment 14A, and thus along the entire length of the electromagnetic sensor streamer (14 in FIG. 1). Typically, a geomagnetic heading sensor 44 will be affixed to the electromagnetic sensor streamer about every 300 meters (every two streamer, segments 14A for streamers segments of about 150 meter length). One type of geomagnetic heading sensor 44 that may be used in some embodiments is described in U.S. Pat. No. 4,481,611 issued to Burrage.

In the present embodiment, the interior space of the jacket 30 may be filled with a material 46 such as buoyancy void filler ("BVF"), which may be a curable, synthetic urethane-based polymer. The BVF 46 may serve to exclude fluid (water) from the interior of the jacket 30, to electrically insulate the various components inside the jacket 30, to add buoyancy to a streamer section, and to add mechanical stability to the streamer. The BVF 46 in its uncured state may be essentially in liquid form. Upon cure, the BVF 46 may no longer flow as a liquid, but instead become substantially solid. However, the BVF 46 upon cure may retain some flexibility to bending stress and may have substantial elasticity. It should be understood that the BVF used in the present embodiment is only one example of a gel-like substance that can be used to fill the interior of the streamer. Other materials could be also used to serve similar purposes. For example, heating a selected substance, such as a thermoplastic, above its melting point, and introducing the melted plastic into the interior of the jacket 30, and subsequent cooling, may also be used in a streamer according to the invention. Oil or similar material may also be used to fill the interior of the streamer.

The sensor holders 32 may be molded from a rigid, dense plastic to better protect the sensors therein from damage during handling and use. An exterior configuration of the sensor holder 32 may be such that the sensor holder 32 fits snugly within the jacket 30. The sensor holders 32 may also be made from foamed polypropylene, as may be the buoyancy spacers 34. While the buoyancy spacers and sensor holders 32 are shown as different structures in the present embodiment, in other embodiments the buoyancy spacers 34 may also function as sensor holders 32. Other embodiments may omit sensor holders entirely and use only buoyancy spacers 34. In example embodiments using sensor holders 32, the sensor holders 32 may include any type of geophysical or other sensor therein, including without limitation pressure sensors, temperature sensors, magnetometers, wire loops or coils, electromagnetic and seismic sensors.

Figure 3:
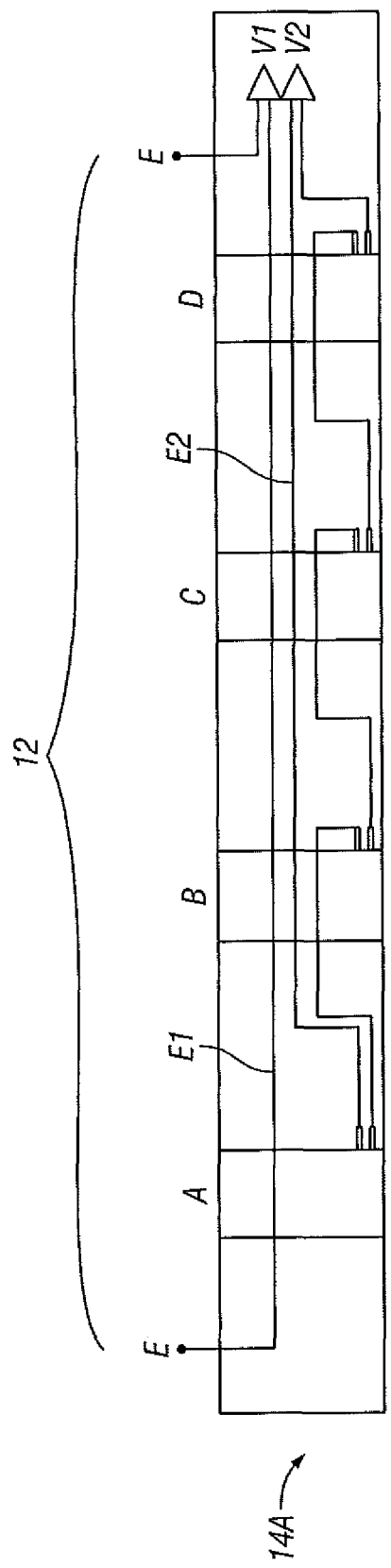
FIG. 3 shows an example embodiment of a plurality of motion responsive sensors and an electromagnetic signal sensor with one example embodiment of electrical interconnection therebetween.

FIG. 3 illustrates one example embodiment of a streamer segment including a motion responsive sensor. The streamer segment 14A may include one or more electromagnetic sensors 12, which in the present embodiment may be spaced apart electrodes E in electrical contact with the water (11 in FIG. 1) outside the jacket (30 in FIG. 2). In the present example embodiment, each electrode E of the electromagnetic sensor 12 may be coupled by a respective wire E1, E2 to an input of a respective first V1 and second V2 voltage measuring circuit. The voltage measuring circuits V1, V2 may be high impedance operational amplifiers or any similar device. The arrangement shown in FIG. 3 includes a first wire E1 extending from one electrode E and coupled to a non-inverting input of the first voltage measuring circuit V1. A second electrode wire E2 may extend from the other electrode E to an inverting input of the second voltage measuring circuit V2. While the electromagnetic sensor(s) are described in the present example embodiment as spaced apart electrodes, it will be apparent to those skilled in the art that any other type of electromagnetic sensor may be used in accordance with an electromagnetic sensor streamer in accordance with the invention. Such other types of sensors include, without limitation, wire loops or coils, magnetic field sensors and magnetometers.

The present example embodiment may include one or more motion responsive sensors. In the present embodiment, the motion responsive sensors may be one, or a plurality of wire loops or coils, shown at A, B, C and D that may be electrically connected in series or other electrical connection. In the present example embodiment, the wire loops or coils A, B, C, D are connected in series, and endmost electrical connections of the series-connected wire loops or coils A, B, C, D may be coupled to the respective remaining inputs of the first V1 and second V2 voltage measuring circuits. Motion sensing may be performed by the wire loops or coils A, B, C, D by electromagnetic induction. Motion of the electromagnetic sensor streamer (14 in FIG. 1) through the water will result in voltage being induced in each wire loop or coil A, B, C, D in relation to the rate of movement of the earth's magnetic flux through the cross-section of each wire loop or coil. U.S. Patent Application Publication No. 2010/0017133 filed by Ziolkowski et al. describes the foregoing electromagnetic induction, and techniques for using the motion-induced voltages to correct detected electromagnetic signals from subsurface formations for the effects of such motion-induced voltages. The voltage measuring arrangement shown in FIG. 3 should not be construed as limiting the types of electrical voltage measurement configurations that are applicable to a streamer made according to the various aspects of the invention, however a possible advantage of the arrangement shown in FIG. 3 is direct compensation of the electromagnetic sensor signals for motion-induced voltages.

Figure 4:
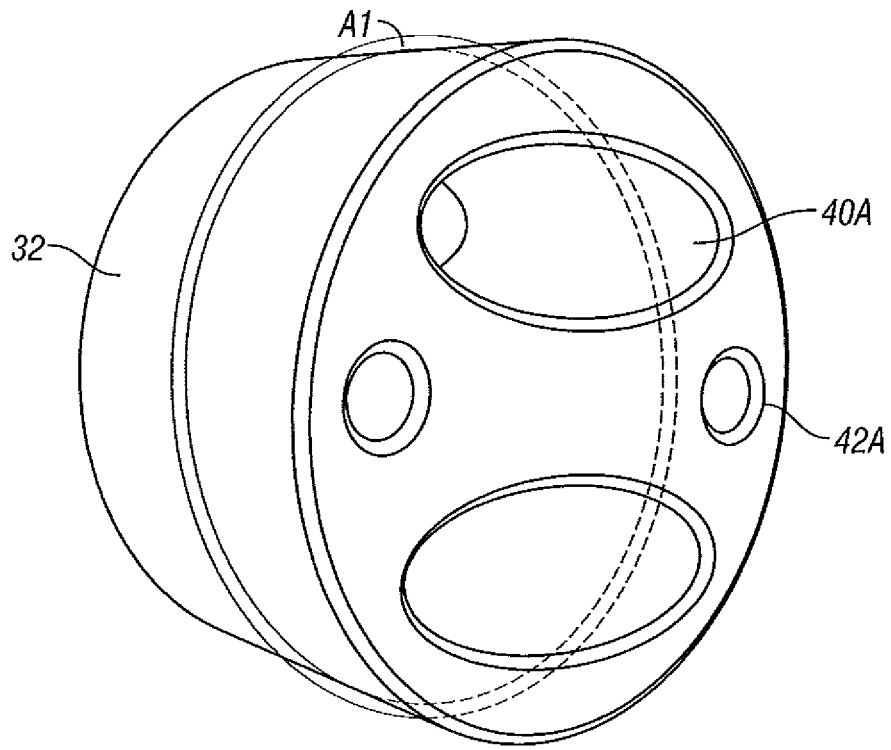
FIG. 4 shows an example embodiment of a motion responsive sensor.

An example embodiment of one of the wire loops or coils that may measure voltage induced by motion of the electromagnetic sensor streamer (14 in FIG. 1) along its longitudinal axis is shown in FIG. 4. One of the sensor holders 32 may include a wire coil, or a plurality of wire coils, shown at A1, wound around the exterior of the sensor holder 32 so that, when current flows through wire coil A1, the magnetic dipole moment of the wire coil(s) A1 is substantially coaxial with the electromagnetic sensor streamer (14 in FIG. 1). For reference, an opening 40A for the conductor cable (40 in FIG. 2) and openings 42A for the strength members (42 in FIG. 2) are shown in the sensor holder 32. The buoyancy spacers (34 in FIG. 2) may be similar in configuration to the sensor holder 32 shown in FIG. 4, in that wire coils such as shown in FIG. 4 may also be wound in similar fashion around the buoyancy spacers (34 in FIG. 2). The wire coil(s) A1 when wound as shown in FIG. 4 will be substantially insensitive to rotation of the electromagnetic sensor streamer (14 in FIG. 1) and to any motion of the streamer transverse to the longitudinal axis of the electromagnetic sensor streamer (14 in FIG. 1).

Figure 5:
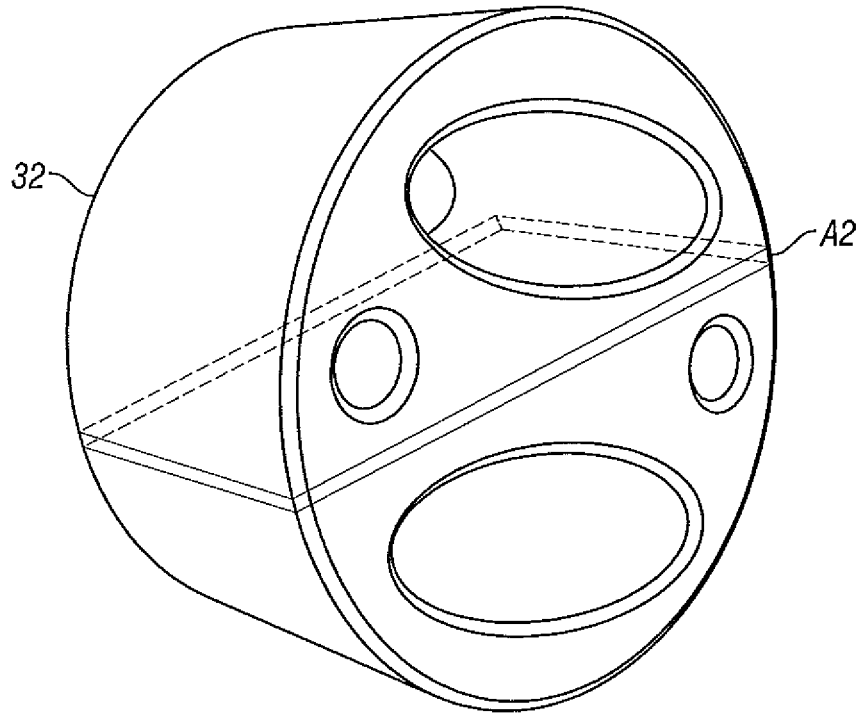
FIG. 5 shows another example embodiment of a motion responsive sensor.

In order to measure components of motion of the electromagnetic sensor streamer along directions transverse to the longitudinal axis of the electromagnetic sensor streamer and to measure rotational motion of the electromagnetic sensor streamer, wire coil(s) A2 as shown in FIG. 5 may be included in one or more of the sensor holders 32 (or in one or more of the buoyancy spacers 34 in FIG. 2). The wire coil(s) A2 shown in FIG. 5 are wound so that, when current flows through wire coil(s) A2, the magnetic dipole moment thereof is transverse to the longitudinal axis of the electromagnetic sensor streamer (14 in FIG. 1). A sensor holder 32 such as shown in FIG. 4 may have the wire coil(s) A2 wound so that in ordinary operation, the magnetic dipole of the wire coil(s) A2 is either or both vertical and horizontal. Vertical and horizontal in the present context is intended to mean that the wire coil(s) shown in FIG. 5 at A2 may be wound on the same or on separate sensor holders and/or buoyancy spacers such that, when current flows through wire coil(s) A2, their magnetic dipoles are at right angles to each other; but in ordinary deployment wherein no torque is applied to the electromagnetic sensor streamer to cause rotation thereof, the wire coils A2 are oriented substantially horizontally and vertically, respectively.

Any of the foregoing example embodiments of wire loops or coils may alternatively be wound around the exterior of the jacket (30 in FIG. 2); however having the wire loops or coils disposed on the exterior of the sensor holders 32 and inside the jacket (30 in FIG. 2) may reduce the possibility of electrical leakage or breakage of the wire loops or coils. It is also believed to be more practical to wind wire loops or coils in planes parallel to the longitudinal axis of the streamer segment (e.g., as shown in FIG. 5) when the wire loops or coils are disposed entirely within the jacket (30 in FIG. 2). As would be apparent to one of ordinary skill in the art, winding wire coils A1, A2 on buoyancy spacers or sensor holders is purely a matter of convenience. It is within the scope of the invention to likewise utilize wire coils disposed within the jacket (30 in FIG. 2), wherein the wire coils are wound around any structure, or no structure, as the case may be.

Figure 6:
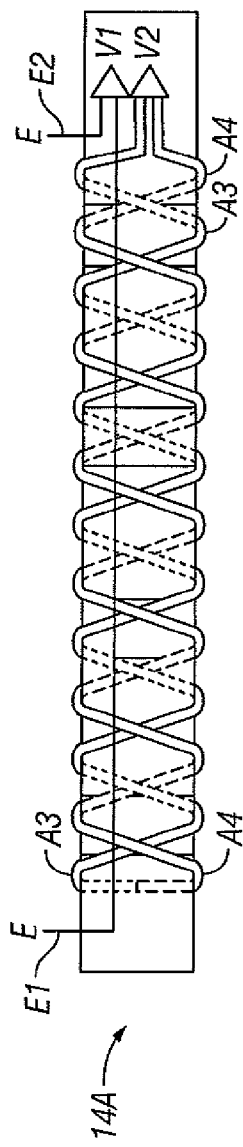
FIG. 6 shows an example streamer segment having thereon another example embodiment of a motion responsive sensor.

Another example embodiment of a motion responsive sensor having a magnetic dipole moment parallel to the longitudinal axis of the electromagnetic sensor streamer (14 in FIG. 1) is shown in FIG. 6. FIG. 6 shows one streamer segment 14A. The example embodiment shown in FIG. 6 may be repeated for any or all of a plurality of streamer segments 14A forming an electromagnetic sensor streamer (14 in FIG. 1). A first wire A3 may be electrically connected at a first end of streamer segment 14A. The first wire A3 may be wound helically around the exterior of the jacket (30 in FIG. 2) in one direction and one lay angle with respect to the longitudinal axis of the streamer segment 14A, and substantially along the entire length of the segment. A second wire A4 may be electrically connected at the other end of streamer segment 14A to a corresponding end of the first wire A3. The second wire A4 may be helically wound around the exterior of the jacket (30 in FIG. 2) in the same direction with respect to the longitudinal axis of the streamer segment 14A as first wire A3, but at a lay angle substantially opposed to the lay angle of the first wire A3. It is also within the scope of the present invention that first and second wires A3, A4 may be made from a single length of wire (not shown); the lay angle may be in one direction during winding the single wire in one direction along the length of the streamer segment 14A, and the lay angle may be reversed when the winding reaches the longitudinal end of the streamer segment and winding proceeds in the opposite direction along the length of the streamer segment. In some embodiments, the first and second wires A3, A4 (or the single wire) may be wound around the exterior of the jacket (30 in FIG. 2) so that adjacent windings are very close, forming a nearly contiguous wire layer around the exterior of the jacket (30 in FIG. 2). In some embodiments, a plurality of spaced-apart wires may be used in place of either first wire A3 or second wire A4 (or the single wire). The ends of the first and second wires A3, A4 (or of the single wire) at the first end of streamer segment 14A and electrode wires E1, E2 may be electrically connected to voltage measuring circuits V1, V2 substantially as explained with reference to FIG. 3. Devices for winding wires or fibers around an article at selected lay angles are described in U.S. Pat. No. 6,620,475 issued to Reynolds et al. Wire coils wound in opposed lay angles and interconnected as shown in FIG. 6 will provide the equivalent of a plurality of wire coils wound in planes transverse to the longitudinal axis of the electromagnetic sensor streamer (14 in FIG. 1), that is, the combined output of the wire coils formed by first and second wires A3, A4 will be substantially insensitive to rotation of the electromagnetic sensor streamer (14 in FIG. 1) and to motion transverse to the longitudinal axis of the electromagnetic sensor streamer (14 in FIG. 1). The embodiment of FIG. 6 may be supplemented by using wire coils on sensor holders wound in planes parallel to the longitudinal axis of the electromagnetic sensor streamer (14 in FIG. 1) as explained with reference to FIG. 5.

In the present example embodiment, it may be desirable to apply a second, outer jacket (not shown) over the jacket (30 in FIG. 2) to reduce the possibility of damage to the first wire A3 or second wire A4. One example of a technique for making a two-layer electromagnetic sensor streamer jacket is described in U.S. Pat. No. 7,693,005 issued to Stenzel et al. and incorporated herein by reference. An example jacket extruder is shown in U.S. Pat. No. 7,142,481 issued to Metzbower et al. and incorporated herein by reference.

The function of the foregoing motion responsive sensor implementations has been verified in the laboratory by the following test procedure. A rigid rod of 2 meters length was fixed in a pivot on one end. The other end of the rigid rode was connected to a wire hung from the ceiling and able to swing back and forth. To model the sensor holder mounted wire coil (e.g., wire coils A1 in FIG. 4 and A2 in FIG. 5), a single coil of approximately 1000 turns of 0.1 millimeter diameter copper wire was mounted in the free-swinging end of the rigid rod with wires routed along the rigid rod to the fixed end thereof, and further to an amplifier. To model the coil wrapped around the electromagnetic sensor streamer as shown at by the winding of first and second wires A3, A4 in FIG. 6, about 150 turns in on lay angle and 150 turns in the other lay angle of copper wire (0.1 mm diameter) was wrapped around the rigid rod and conducted to an amplifier proximate the fixed end of the rigid rod. In the moving end of the rod, the two wires were connected together to form a closed loop. Finally, to model the electrode interconnection wires (as shown in FIG. 3 and FIG. 6), a single wire was fixed along the length of the rigid rod. At the free-swinging end of the rigid rod, some slack was allowed for the movement of the rigid rod. The wire doubled back and routed back to the fixed end of the rigid rod, where the two ends were connected to an amplifier. The fixed route along the length of the rigid rod approximates the conduction between electrodes in the sea-water (with zero voltage potential between the electrodes).

Figure 7:
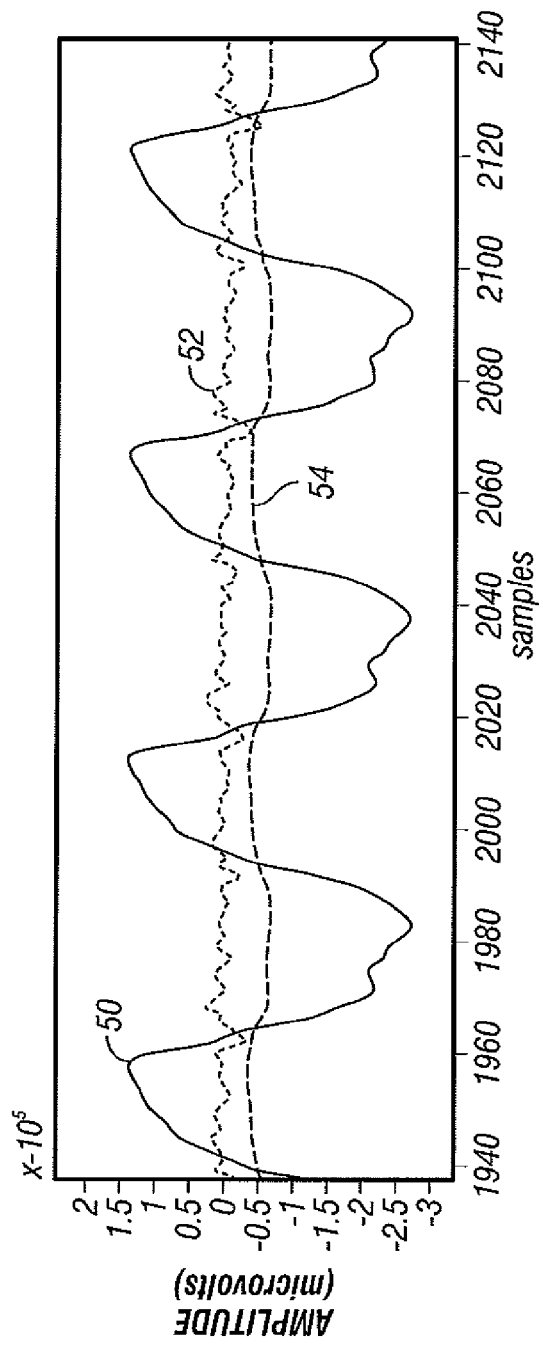
FIG. 7 shows a graph of test results of one example embodiment of a motion responsive sensor.

The free end of the rigid rod was then swung back and forth at about 1 Hz frequency, which approximated the electromagnetic sensor streamer motion in the water and caused a voltage to be induced in the representative "electrode wire" and the representative "coils" respectively. The respective induced voltages were detected and amplified by the amplifiers and subsequently digitized in analog to digital converters. Wiener/reference filtering, as described for towing noise reduction using other sensors are described in Ronaess et al., U.S. Pat. No. 7,671,598, which is herein incorporated by reference, was applied to filter the induced voltage in the electrode wire by use of the signal from either coil. As can be observed in FIG. 7, the electrode wire signal prior to filtering, shown at curve 50, includes a relatively large amplitude induced voltage. Voltage induced in one of the coils, shown at curve 54, was used to generate a filter operator. The filter operator thus generated was applied to the measured electrode wire voltage signal to generate a filtered signal as shown at curve 52. It may be observed that substantially all the motion induced voltage has been filtered using voltage induced in the sensor coil. It is expected that the above described types of sensor will be effective in filtering motion induced noise in sensor connection wires in an electromagnetic sensor streamer.

It should also be clearly understood that the example electrical connections of the various electromagnetic motion sensing loops described herein with reference to FIGS. 3, 4, 5 and 6 are, not limited to the electrical connections explained with reference to FIG. 3. It is within the scope of the present invention to have each wire coil connected to an individual amplifier, or to have combinations of loops connected in series and/or parallel. It is also within the scope of the present invention to include a multiplexer between the various motion detecting induction wire coils and a single amplifier, wherein the individual induced voltage measurements may be processed in any combination to provide the most effective indication of the amount of motion-induced electrical noise imparted to electromagnetic sensors on a sensing cable designed for marine electromagnetic surveying.

One of the many possible benefits of the devices and methods contained in this disclosure is that electromagnetic noise induced by the motion of an electromagnetic streamer may be detected while the streamer is used in a marine electromagnetic survey. A better understanding of the electromagnetic noise may allow for more accurate analysis of electromagnetic data collected during the survey. Moreover, more accurate data analysis may provide for a more precise understanding of the location and/or composition of fluids contained in a subterranean formation, which can be used to more efficiently determine where to locate a drilling operation to have the best chances of producing valuable fluids, such as hydrocarbons.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic sensor streamer, comprising:
a jacket;
at least one electromagnetic sensor in operational communication with a voltage measuring circuit disposed inside the jacket; and
at least one wire coil, wherein the at least one wire coil comprises a first and a second wire helically wound along substantially an entire length of the wire coil in opposed lay angles,
wherein the at least one wire coil is in signal communication with the voltage measuring circuit, and the voltage measuring circuit is configured to determine motion-induced voltages imparted to the at least one electromagnetic sensor in the streamer.

2. The electromagnetic sensor streamer of claim 1 wherein the at least one wire coil is wound on an exterior of the jacket.

3. The electromagnetic sensor streamer of claim 1 wherein the at least one wire coil is wound on at least one of a buoyancy spacer disposed inside the jacket and a sensor holder disposed inside the jacket.

4. The electromagnetic sensor streamer of claim 3 wherein the at least one wire coil is wound such that, when current flows through the at least one wire coil, its magnetic dipole moment is substantially transverse to the longitudinal axis of the streamer.

5. The electromagnetic sensor streamer of claim 4 further comprising a second wire coil, wherein the second wire coil is wound such that, when current flows through the at least one wire coil and the second wire coil, a dipole moment of the second wire coil is transverse to both the dipole moment of the at least one wire coil and the longitudinal axis of the streamer.

6. The electromagnetic sensor streamer of claim 5 wherein the second wire coil is wound around at least one of the buoyancy spacer, the sensor holder, an additional buoyancy spacer, and an additional sensor holder.

7. The electromagnetic sensor streamer of claim 1 wherein the at least one electromagnetic sensor comprises a pair of spaced apart electrodes in operational communication with an exterior of the jacket.

8. The electromagnetic sensor streamer of claim 1 wherein the at least one wire coil is wound such that, when current flows through the at least one wire coil, its magnetic dipole moment is substantially parallel to the longitudinal axis of the streamer.

9. The electromagnetic sensor streamer of claim 1 wherein the first and second wires comprise a single length of wire.

10. The electromagnetic sensor streamer of claim 1 further comprising a plurality of wire coils connected in electrical series.

11. A method of electromagnetic surveying a subterranean formation comprising:
  towing a streamer with a vessel in a body of water, wherein the streamer comprises:
    a jacket,
    at least one electromagnetic sensor in operational communication with a voltage measuring circuit disposed inside the jacket,
    at least one wire coil, wherein the at least one wire coil comprises a first and a second wire helically wound along substantially an entire length of the wire coil in opposed lay angles wherein the at least one wire coil is in signal communication with the voltage measuring circuit, and the voltage measuring circuit is configured to determine motion-induced voltages imparted to the at least one electromagnetic sensor in the streamer;
  detecting electromagnetic noise induced by motion of the streamer relative to the earth's magnetic field with the voltage measuring circuit; and
  detecting electromagnetic signals from the subterranean formation.

12. The method of claim 11, wherein the at least one wire coil is wound on an exterior of the jacket.

13. The method of claim 11, wherein the at least one wire coil is wound on at least one of a buoyancy spacer disposed inside the jacket and a sensor holder disposed inside the jacket.

14. The method of claim 13 wherein the at least one wire coil is wound such that, when current flows through the at least one wire coil, its magnetic dipole moment is substantially transverse to the longitudinal axis of the streamer.

15. The method of claim 14 further comprising a second wire coil, wherein the second wire coil is wound such that, when current flows through the at least one wire coil and the second wire coil, a dipole moment of the second wire coil is transverse to both the dipole moment of the at least one wire coil and the longitudinal axis of the streamer.

16. The electromagnetic sensor streamer of claim 15 wherein the second wire coil is wound around at least one of the buoyancy spacer, the sensor holder, an additional buoyancy spacer, and an additional sensor holder.

17. The method of claim 11, wherein the at least one electromagnetic sensor comprises a pair of spaced apart electrodes in operational communication with an exterior of the jacket.

18. The method of claim 11 wherein the at least one wire coil is wound such that, when current flows through the at least one wire coil, its magnetic dipole moment is substantially parallel to the longitudinal axis of the streamer.

19. The method of claim 11 wherein the first and second wires comprise a single length of wire.

20. The method of claim 11 further comprising a plurality of wire coils connected in electrical series.

* * * * *